United States Patent
Haglund et al.

(10) Patent No.: US 11,164,338 B2
(45) Date of Patent: Nov. 2, 2021

(54) METHOD AND SYSTEM FOR NAVIGATION OF A VEHICLE

(71) Applicant: Maxar International Sweden AB, Linkoeping (SE)

(72) Inventors: Leif Haglund, Brokind (SE); Thomas Beckman, Linkoeping (SE)

(73) Assignee: Maxar International Sweden AB, Linkoeping (SE)

(*) Notice: Subject to any disclaimer, the term of this patent is extended or adjusted under 35 U.S.C. 154(b) by 27 days.

(21) Appl. No.: 16/690,762

(22) Filed: Nov. 21, 2019

(65) Prior Publication Data
US 2020/0410717 A1 Dec. 31, 2020

(30) Foreign Application Priority Data
Jun. 27, 2019 (SE) .................... 1950805-0

(51) Int. Cl.
*G06T 7/90* (2017.01)
*G06F 16/29* (2019.01)
*G05D 1/08* (2006.01)
*G06T 7/00* (2017.01)
*G06T 7/40* (2017.01)

(52) U.S. Cl.
CPC .......... *G06T 7/90* (2017.01); *G05D 1/0808* (2013.01); *G06F 16/29* (2019.01); *G06T 7/0002* (2013.01); *G06T 7/40* (2013.01)

(58) Field of Classification Search
CPC .......... G06T 7/40; G06T 7/90; G06T 7/0002
See application file for complete search history.

(56) References Cited

U.S. PATENT DOCUMENTS 8,000,895 B2 8/2011 Shulman
9,360,321 B2* 6/2016 Haglund ................. G01S 19/13
(Continued)

FOREIGN PATENT DOCUMENTS

WO WO-2015/160288 A1 10/2015
WO WO 2019/086465 A1 5/2019

OTHER PUBLICATIONS

Swedish Patent and Registration Office, Office Action and Search Report for Swedish Patent Application No. 1950805-0, dated Dec. 30, 2019, (6 pages), Stockholm, Sweden.
(Continued)

*Primary Examiner* — Sam Bhattacharya
(74) *Attorney, Agent, or Firm* — Alston & Bird LLP (57) ABSTRACT

The present disclosure relates to a method and system for navigation of an aerial vehicle. The method (100) comprises providing (110) a sensor image from an aerial vehicle sensor and repeatedly, until at least one predetermined criterion is reached, performing the steps: setting (120) input data comprising information related to pitch angle, roll angle, yaw angle and three-dimensional position of the aerial vehicle; providing (130) at least one two-dimensional perspective view image based on the input data, where the at least one two-dimensional perspective view image is obtained from a database comprising three-dimensional geo-referenced information of the environment, said three-dimensional geo-referenced information comprising texture data; and comparing (140) the sensor image and the at least one two-dimensional perspective view image.

16 Claims, 3 Drawing Sheets

(56) References Cited

U.S. PATENT DOCUMENTS

| | | |
|---|---|---|
| 9,483,842 B2 * | 11/2016 | Haglund .................. G06T 7/32 |
| 9,689,686 B1 | 6/2017 | Carmack et al. |
| 2011/0002825 A1 | 11/2011 | Mohan |
| 2015/0292887 A1 | 10/2015 | Haglund et al. |
| 2017/0364095 A1 | 12/2017 | Wang et al. |
| 2018/0045522 A1 | 2/2018 | Aziz |

OTHER PUBLICATIONS

European Patent Office, Extended European Search Report received for Application No. 20179341.1, dated Dec. 23, 2020, 8 pages, Germany.

* cited by examiner

METHOD AND SYSTEM FOR NAVIGATION OF A VEHICLE

CROSS REFERENCE TO RELATED APPLICATIONS

This application claims priority to and the benefit of Swedish Patent Application No. 1950805-0, filed on Jun. 27, 2019, the contents of which as are hereby incorporated by reference in their entirety.

BACKGROUND

Technical Field

The present invention relates to a method and a system for navigation of a vehicle based on a sensor image and use of a database of the environment comprising three-dimensional geo-referenced information.

The present disclosure further relates to a computer program and a computer program product for navigation of a vehicle.

Related Art

Navigation of vehicles, especially aerial vehicles, is today often based on a global navigation satellite system (GNSS), like GPS. This has the advantage that the position of the own vehicle is quite well known within some uncertainty. It can, however, happen that a vehicle has to travel through an area where a GNSS-signal is denied, for example during war or conflicts, or since some entity for whatever reason uses interfering transmitters to disturb GNSS-signals. Also technical failures might in principle cause GNSS-signal interruption.

To be able to navigate without GNSS some vehicles have inertial measurements units (IMU) on board. They can be used to keep track of the vehicle's current position using a process called dead reckoning. These IMU-systems have, however, the tendency that the calculated position will differ from the real position more and more with time. This is due to the fact that errors entering the calculations add up. Therefore, the longer the time a vehicle navigates with an IMU only, the bigger the uncertainty about the actual real position of that vehicle.

WO 2015/160288 discloses a method for navigation which does not require a GNSS. The method is based on use of a sensor image and a database comprising three-dimensional georeferenced information of the environment.

BRIEF SUMMARY

An object of the present disclosure is to extend applicability and/or increase reliability of image based sensor navigation.

This object is achieved, by way of non-limiting example, by a method for navigation of a vehicle. The method comprises providing a sensor image from a vehicle sensor and repeatedly, until at least one predetermined criterion is reached. The method comprises a step of setting input data comprising information related to pitch angle, roll angle, yaw angle and three-dimensional position of the vehicle. The method further comprises a step of providing at least one two-dimensional perspective view image based on the input data, where the at least one two-dimensional perspective view image is obtained from a database comprising three-dimensional geo-referenced information of the environment, said three-dimensional geo-referenced information comprising texture data. The method further comprises a step of comparing the sensor image and the at least one two-dimensional perspective view image. When at least one of the at least one predetermined criterion is reached, a step is performed using the input data for the two-dimensional perspective view image best corresponding to the sensor image to determine a value for at least one of the following quantities pitch angle, roll angle, yaw angle and three-dimensional position of the vehicle. The texture data comprises a first set of texture data representing a surface of Earth under low ambient light conditions. The comparing step comprises matching the sensor image and the two-dimensional perspective view image formed from the first set of texture data. Thus, an low ambient light two-dimensional perspective view image is used for comparison with the sensor image.

Navigation of vehicles using an image sensor may be problematic during low light conditions. Utilizing a database comprising low ambient light information may solve this problem. Utilizing a database comprising low ambient light information and daylight information may allow for navigation regardless of ambient light conditions.

The step of setting input data relates to the assumed position and orientation of the vehicle. As stated above, the input data comprises information related to the pitch angle, roll angle, yaw angle and three-dimensional position of the vehicle. The first instance of setting input data may use the currently assumed values for pitch angle, roll angle, yaw angle and three-dimensional position. During subsequent instances of setting input data the input data may be updated based on the comparison of the sensor image and the at least one two-dimensional perspective view image.

As is clear from the above, the step of comparing images may comprise obtaining the sensor image and the two-dimensional perspective view image, matching the images and deciding if the predetermined at least one criterion is met. When the at least one criterion is not met the input data is updated. The updated input data is used to generate a new two-dimensional perspective view image and the new two-dimensional perspective view image is compared with the sensor image. The goal of updating the input data is to generate a two-dimensional perspective view image with better correlation with the sensor image and/or to be able to satisfy at least one more criterion.

In the case that the at least one criterion for an acceptable match between a two-dimensional perspective view image and the sensor image is met, the input data correlating to the two-dimensional perspective best matching the sensor image is used to determine at least one of the following quantities pitch angle, roll angle, yaw angle and three-dimensional position of the vehicle. As an example, if the input data of the two-dimensional perspective view image best correlating to the sensor image relates to the same roll angle, yaw angle and three-dimensional position as assumed but relates to a significantly different pitch angle then the assumed pitch angle may be set to the pitch angle relating to the input data.

The first set of texture data may be created based on low ambient light images captured under low ambient light conditions.

The texture data may further comprise a second set of texture data created based on daylight images captured under daylight conditions.

The three-dimensional geo-referenced information of the environment may comprise the three-dimensional geo-referenced coordinate data and associated two-dimensional perspective view satellite images related to a plurality of views, wherein at least some of the two-dimensional perspective view satellite images comprise the first set of texture data At least some of the two-dimensional perspective view satellite images comprise the second set of texture data.

The step of providing a two-dimensional perspective view image based on the input data may comprise providing the two-dimensional perspective view image in such a way that the perspective view corresponds to the perspective view of the vehicle sensor, wherein it is assumed that the vehicle has its pitch angle, roll angle, yaw angle and three-dimensional position according to the input data.

The step of providing at least one two-dimensional perspective view image may comprise a step of obtaining light condition information related to whether the sensor image was captured under low-light conditions and at least when it is determined that capture occurred under low-light conditions, provide the at least one low ambient light two-dimensional perspective view image formed from the first set of texture data.

Thus, the step of providing at least one two-dimensional perspective view image may utilize the light condition information to generate at least one two-dimensional perspective view image corresponding to the light condition information. The generated at least one two-dimensional perspective view image may be arranged to represent a perspective view of a part of Earth's surface under light conditions similar to the light conditions during capture of the sensor image.

The step of obtaining light condition information related to whether the sensor image was captured under low-light conditions may comprise obtaining user input indicating whether the sensor image was captured under low-light conditions.

The step of obtaining light condition information related to whether the sensor image was captured under low-light conditions may comprise obtaining sensor data from at least one light sensitive sensor. The light sensitive sensor may be the sensor capturing the sensor image or another light sensitive sensor.

The step of obtaining light condition information related to whether the sensor image was captured under low-light conditions may comprise obtaining time information, wherein the light condition is determined based on a relation between the time information and a time of sunrise/sunset.

The method may when comprising a step of obtaining light condition information further comprise a step of comparing the sensor image with a daylight two-dimensional perspective view image provided from the second set of texture data and/or a low ambient light two-dimensional perspective view image provided from the first set of texture data, said sensor image, daylight perspective view image and low ambient light perspective view image corresponding to the same perspective view, and determining whether the sensor image was captured under low-light conditions based on said comparison.

The step of comparing the sensor image with the at least one two-dimensional perspective view image may comprise comparing the sensor image with a daylight perspective view image provided from the second set of texture data and the low ambient light two-dimensional perspective view image provided from the first set of texture data. The method may then further comprise a step of determining input data for which the sensor image and the at least one two-dimensional perspective view image correspond best to each other for both the daylight perspective view image and the low ambient light perspective view image, wherein at least one of the following quantities pitch angle, roll angle, yaw angle and three-dimensional position of the vehicle is determined based on the determined input data relating to the daylight perspective view image and the determined input data relating to the low ambient light perspective view image.

The step of comparing the sensor image with a daylight two-dimensional perspective view image provided from the second set of texture data and/or a low ambient light two-dimensional perspective view image provided from the first set of texture data may comprise comparing the sensor image with at least one two-dimensional perspective view image generated based on the database representing Earth's surface during dusk and/or dawn light conditions.

The database may be arranged to provide three-dimensional geo-referenced information relating to at least two light point in the two-dimensional perspective view image and the comparison step comprises comparing the light point information and at least two detected light points in the sensor image.

Further, an uncertainty measure may be determined at least for the matching of the sensor image to the two-dimensional perspective view image (230) which best corresponds to the sensor image.

The present disclosure further relates to a computer program for vehicle navigation. The computer program comprises routines for performing the method according to the present disclosure. In one example the computer program is an application on at least one computer.

The present disclosure further relates to a computer program product. The computer program product comprises a program code stored on a readable data storage medium for vehicle navigation. The data storage medium can be non-volatile. The program code is configured to execute the method according to the present disclosure.

The present disclosure further relates to a system for navigation of a vehicle. The system comprises a database comprising three-dimensional geo-referenced information of the environment, said three-dimensional geo-referenced information comprising texture data; at least one vehicle sensor arranged to provide a sensor image; a processor and a memory storage device comprising a computer program product arranged to when run on the processor, control the vehicle sensor to provide a sensor image, and repeatedly, until at least one predetermined criterion is reached, repeat the steps to: set input data comprising information related to pitch angle, roll angle, yaw angle and three-dimensional position of the vehicle, provide input data to the database, whereby the database provides at least one two-dimensional perspective view image based on the input data, and compare the sensor image and at least one of the at least one two-dimensional perspective view image from the database.

When the comparison fulfills at least one criterion, the input data for which the corresponding two-dimensional perspective view image correspond best to the sensor image is used to determine at least one value of the following quantities pitch angle, roll angle, yaw angle and three-dimensional position of the vehicle. The texture data comprises a first set of texture data representing the surface of Earth under low ambient light conditions. At least one of the at least one two-dimensional perspective view image is formed from the first set of texture data. Said at least one low ambient light two-dimensional perspective view image is then compared to the sensor image in the comparing step.

In different embodiments, the first set of texture data is created based on low ambient light images.

In different embodiments, the sensor image comprises at least two detected light points and the comparison step comprises comparing the detected light points with the light points in the two-dimensional perspective view image.

In different embodiments, the vehicle is an aerial vehicle.

BRIEF DESCRIPTION OF THE SEVERAL VIEWS OF THE DRAWINGS

Throughout the figures, same reference numerals refer to same parts, concepts, and/or elements. Consequently, what will be said regarding a reference numeral in one figure applies equally well to the same reference numeral in other figures unless not explicitly stated otherwise.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Still further, to facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Figure 1:
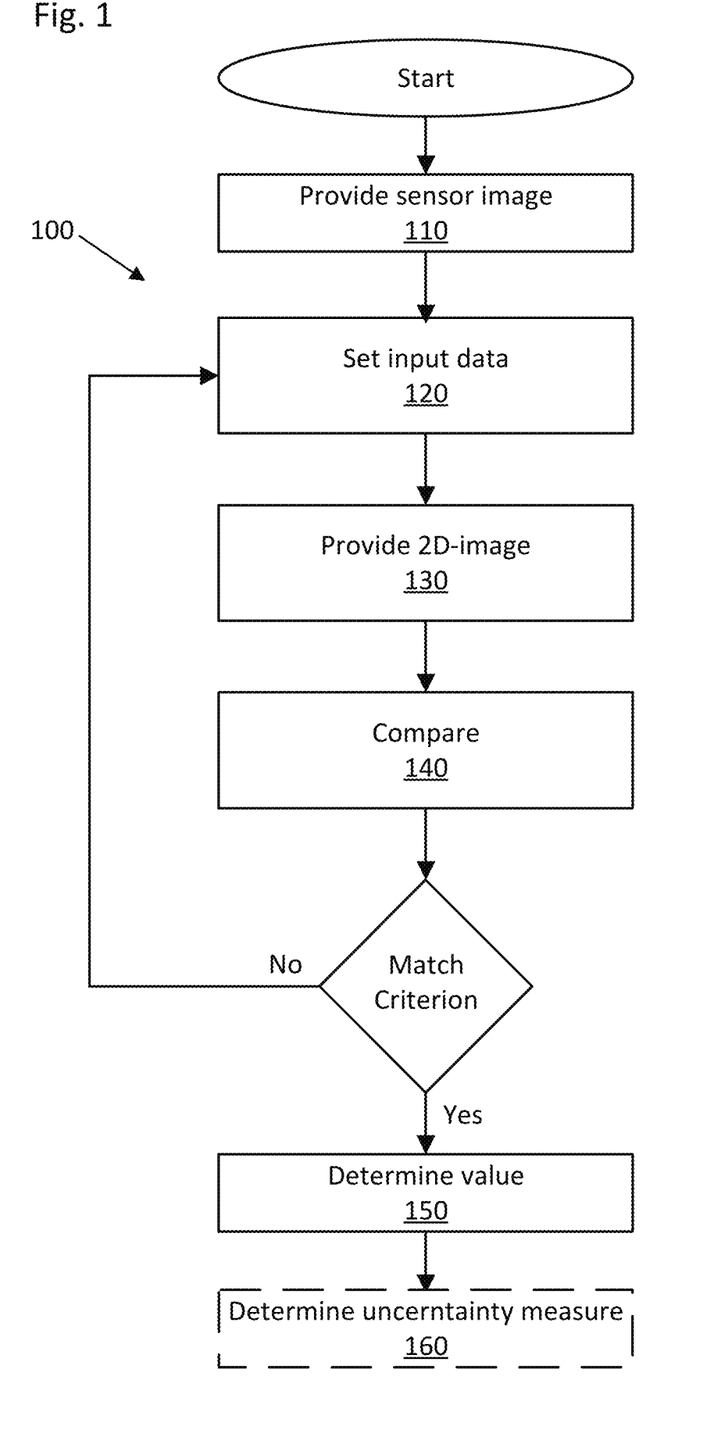
FIG. 1 depicts schematically a method for navigation of a vehicle.

FIG. 1 depicts schematically a method 100 for navigation of a vehicle. The method 100 for navigation of an vehicle comprises providing 110 a sensor image from a sensor. The sensor image may be a two-dimensional visual image.

The method further comprises to repeatedly, until at least one predetermined criterion is reached, perform the following steps. First, input data comprising information related to pitch angle, roll angle, yaw angle and three-dimensional position of the vehicle is set 120. The step of setting 120 input data relates to the assumed position and orientation of the vehicle. The first instance of setting 120 input data may be based on the currently assumed values for pitch angle, roll angle, yaw angle and three-dimensional position. During subsequent instances of setting 120 input data, the input data is updated. The updating may be based on the input data and a comparison of the sensor image with at least one two-dimensional perspective view image, as will be described in detail below.

After setting the input data, at least one two-dimensional perspective view image is provided 130 based on the input data. The at least one two-dimensional perspective view image is obtained from a database comprising three-dimensional geo-referenced information of the environment, wherein the tree-dimensional georeferenced information comprises texture data. The step of providing 130 a two-dimensional perspective view image based on the input data may comprise providing 130 the two-dimensional perspective view image in such a way that the perspective view of the two-dimensional prespective view image corresponds to the perspective view of the aerial vehicle sensor, where it is assumed that the aerial vehicle has its pitch angle, roll angle, yaw angle and three-dimensional position according to the input data.

The step of a providing 130 a two-dimensional perspective view image comprises obtaining the input data, relating the input data to a representation of at least part of Earth's surface comprised in the database and obtaining the two-dimensional perspective view image based on the relation between the input data and the representation of the Earth's surface of said database. As is clear from the above, the database comprises three-dimensional geo-referenced information of the environment, wherein the three-dimensional geo-referenced information comprises texture data. The database comprises a representation of a part of Earth's surface under low ambient light conditions. The step of providing 130 a two-dimensional perspective view image comprises generating at least one two-dimensional perspective view image relating to a surface of Earth under low ambient light conditions. Light condition information relating to the ambient light conditions during sensor image capture may be used to determine if a representation relating to a surface of Earth under low ambient light conditions is used to generate a two-dimensional perspective view image.

The texture data comprises a first set of texture data formed based on low ambient light images captured under low ambient light conditions. The texture data may further comprise a second set of texture data formed based on daylight images captured under daylight conditions.

The texture data comprised in the database may be based on two-dimensional perspective view satellite images captured during low ambient light conditions. At least some of the two-dimensional perspective view satellite images may be captured during daylight conditions.

The at least one provided two-dimensional perspective view image may be of the same dimensions as the sensor image. Thus, the two-dimensional perspective view image covers then a ground area of essentially the same size as the sensor image.

The step of providing 130 at least one two-dimensional perspective view image may comprise obtaining light condition information related to whether the sensor image was captured under low-light conditions and at least when it is determined that capture occurred under low-light conditions, provide 130 at least one low ambient light two-dimensional perspective view image formed from the first set of texture data.

The step of obtaining light condition information related to whether the sensor image was captured under low-light conditions may comprise obtaining user input indicating whether the sensor image was captured under low-light conditions. The step of obtaining light condition information related to whether the sensor image was captured under low-light conditions may comprise obtaining time information, wherein the light condition is determined based on a relation between the time information and a time of sunrise/sunset. The step of obtaining light condition information related to whether the sensor image was captured under low-light conditions may comprise obtaining sensor data from at least one light sensitive sensor. The light sensitive sensor may be the sensor which captures the sensor image as discussed herein or another light sensitive sensor.

The step of providing 130 at least one two-dimensional perspective view image may utilize the light condition information to generate at least one two-dimensional perspective view image. For example, the sensor image may be compared with a daylight two-dimensional perspective view image provided based on the second set of texture data and/or a low ambient light two-dimensional perspective view image provided based on the first set of texture data, said sensor image (210), daylight perspective view image (230) and low ambient light perspective view image (230) corresponding to the same perspective view. Then it may be determined whether the sensor image was captured under low-light conditions based on said comparison.

The sensor image is compared 140 to the provided at least one two-dimensional perspective view image. The comparing step 140 comprises matching the sensor image and the two-dimensional perspective view image formed from the first set of texture data. Thus, the low ambient light two-dimensional perspective view image is compared with the sensor image. Setting 120 new input data values may be based on the results from comparing 140 the sensor image and the at least one two-dimensional perspective view image.

The comparison step 140 may at least under the low ambient light conditions comprise matching light points in the two-dimensional perspective view image with detected light point in the sensor image. Characteristically, stationary light beacons such as light houses, aircraft warning lights or population centres are visible under the low ambient light conditions and used in the matching.

The step of comparing 140 the sensor image with the at least one two-dimensional perspective view image provided from the database may comprise comparing the sensor image with a daylight perspective view image provided from the database and a low ambient light two-dimensional perspective view image generated based on the database. Thus, the sensor image may be compared with both the first and second sets of texture data. The comparing step 140 may further comprise a step of determining input data for which the sensor image and the at least two two-dimensional perspective view images correspond best to each other for both the daylight perspective view image and the low ambient light perspective view image. Said determined input data relating to both the daylight perspective view image and the low ambient light perspective view image may then be used to determine 150 a value for at least one of the following quantities pitch angle, roll angle, yaw angle and three-dimensional position of the vehicle.

The step of comparing 140 images comprises obtaining the sensor image and the two-dimensional perspective view image and matching the images. The matching of images may utilize at least one algorithm arranged to output a set of correlation values. The set of correlation values may comprise statistical correlation between images and may comprise any information related to the comparisons of two-dimensional images.

It is then determined if the predetermined at least one criterion is met. Said set of correlation values may be used to determine if the predetermined at least one criterion is met.

In the case that the at least one criterion is not met the input data is updated 120. The updated input data is used to provide 130 a new two-dimensional perspective view image and the new two-dimensional perspective view image is compared 140 with the sensor image. The updating 120 of input data may be based on the comparison between two-dimensional perspective view images and the sensor image. The input data may be updated 120 based on at least one algorithm arranged to calculate a new input data with a corresponding new at least one two-dimensional perspective view image expected to have stronger correlation with the sensor image than previous at least one two-dimensional perspective view image. The goal of updating 120 the input data is to generate a two-dimensional perspective view image with better correlation with the sensor image and/or to be able to satisfy at least one more criterion.

In the case that the at least one criterion for an acceptable match between a two-dimensional perspective view image and the sensor image is met, a determining step 150 is performed wherein the input data correlating to the two-dimensional perspective best matching the sensor image is used to determine at least one of the following quantities pitch angle, roll angle, yaw angle and three-dimensional position of the vehicle. As a determining example, if the input data of the two-dimensional perspective view image best correlating to the sensor image relates to the same roll angle, yaw angle and three-dimensional position as assumed but relates to a significantly different pitch angle then the assumed pitch angle may be set to the pitch angle relating to the input data. The new values for pitch angle, roll angle, yaw angle and/or three-dimensional position of the vehicle are expected to better match reality.

The method 100 may comprise at least one criterion for ending the method without a step of determining 150 at least one of the following quantities pitch angle, roll angle, yaw angle and three-dimensional position of the vehicle At least one criterion for ending the method may be related to updating the input data a predetermined number of times without improving correlation between at least one two-dimensional perspective view image and the sensor image. At least one criterion for ending the method may be related to correlation between at least one two-dimensional perspective view image and the sensor image below a predetermined threshold. As least one criterion may be related to an uncertainty measure associated to the three-dimensional geo-referenced information of the environment comprising texture data, corresponding to the input data. At least one criterion for ending the method may be related to the amount of time since the sensor image was captured and a predetermined maximum amount of time The vehicle may be an aerial vehicle, a land or sea based vehicle or an underwater vehicle.

Further, an uncertainty measure may be determined 160 at least for the matching of the sensor image to that two dimensional perspective view image which best corresponds to the sensor image. The uncertainty measure represents the uncertainty in the matching.

For example, the uncertainty measure may be a Figure of Merit, FOM, measure. FOM is a numerical quantity based on one or more characteristics of a system or device that represents a measure of efficiency or effectiveness.

In one example, Expected Position Error, EPE, is output as the FOM. EPE is a 1-sigma calculation of 3D position solution estimate of error. EPE is expressed in meters, and a smaller EPE indicates a higher quality position solution. Similarly computed values may also be used including: EHE, Expected Horizontal Error (defined as 1-sigma estimate of 2D error) and EVE, Expected Vertical Error (defined as 1-sigma estimate of one-dimensional error). The EPE is characteristically defined as $EPE=\sqrt{(EHE^2+EVE^2)}$. EPE is one of the best available indicators of quality for navigation systems.

Figure 2:
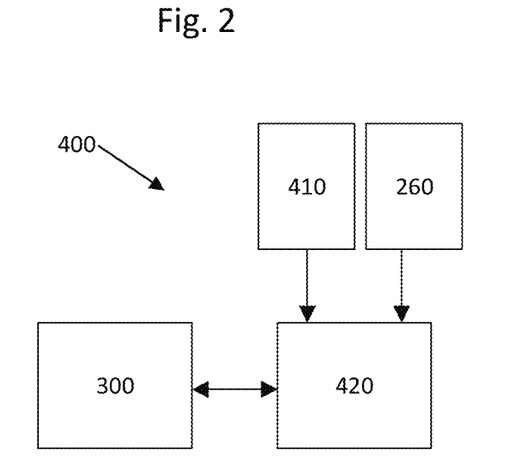
FIG. 2 depicts schematically a system for navigation of a vehicle.

FIG. 2 depicts schematically a system 400 for navigation of a vehicle such as an aerial vehicle, a land or sea based vehicle or an underwater vehicle. In the following, the vehicle is referred to as an aerial vehicle. The system 400 comprises a database 300 comprising three-dimensional geo-referenced information of the environment, said three-dimensional geo-referenced information comprising texture data. The texture data comprises a first set of texture data representing the surface of the Earth under low ambient light conditions. The first set of texture data is created based on low ambient light images. The texture data may further comprise a second set of texture data representing the surface of the Earth under low daylight conditions. The second set of texture data is created based on daylight images captured under daylight conditions.

The database 300 comprising three-dimensional geo-referenced information of the environment may comprise three-dimensional geo-referenced coordinate data and associated two-dimensional perspective view satellite images related to a plurality of views, wherein at least some of the two-dimensional perspective view satellite images are captured under low ambient light conditions. The three-dimensional geo-referenced information of the environment may comprise at least some two-dimensional perspective view satellite images 350 captured under daylight conditions. The two-dimensional perspective view satellite images then form the texture data.

The system 400 may comprise at least one light sensitive sensor 260 arranged to provide sensor data. Light condition information related to whether the sensor image was captured under low-light conditions may be based on said sensor data.

The system comprises further at least one aerial vehicle sensor 410 arranged to provide a sensor image. The aerial vehicle sensor is arranged to capture images of at least part of the ground. The sensor image may be a two-dimensional visual image. The at least one aerial vehicle sensor may be a camera. It is assumed that the camera is calibrated. It is assumed that the camera is calibrated at least with respect to field of view and length distrosion. Camera calibration can be achieved using any method known in the art. The camera calibration may be made in advance and/or on the run. If made one the run, the camera calibration may be made integrated with processing for navigation as disclosed herein. Alternatively, camera calibration is made independently of the processing for navigation.

The system comprises further a processor 420 and a memory storage device (not shown) comprising a computer program product arranged to when run on the processor 420, control the aerial vehicle sensor 410 to provide a sensor image, and repeatedly, until at least one predetermined criterion is reached, repeat the steps to: set input data comprising information related to pitch angle, roll angle, yaw angle and three-dimensional position of the aerial vehicle, provide input data to the database, whereby the database provides at least one two-dimensional perspective view image based on the input data, and compare the sensor image and at least one of the at least one two-dimensional perspective view image from the database.

When the comparison fulfills at least one criterion, the input data for which the corresponding two-dimensional perspective view image correspond best to the sensor image is used to determine at least one value of the following quantities pitch angle, roll angle, yaw angle and three-dimensional position of the aerial vehicle. The texture data comprises a first set of texture data representing a surface of Earth under low ambient light conditions. At least one of the at least one two-dimensional perspective view image (230) is formed from the first set of texture data. Accordingly, the at least one low ambient light two-dimensional perspective view image (230) and the sensor image (210) is compared in the comparing step (140). The at least one low ambient light two-dimensional perspective view image is provided in such a way that the perspective view corresponds to the perspective view of the aerial vehicle sensor, where it is assumed that the aerial vehicle has its pitch angle, roll angle, yaw angle and three-dimensional position according to the input data.

The computer program product may at least partly be run on the processor 420.

The computer program may when run on the processor 420 compare the sensor image with a daylight two-dimensional perspective view image provided by the database 300 and/or a low ambient light two-dimensional perspective view image provided by the database 300, said sensor image, daylight perspective view image and low ambient light perspective view image corresponding to the same perspective view, and determining whether the sensor image was captured under low-light conditions based on said comparison.

The comparing of the sensor image with the at least one two-dimensional perspective view image generated based on the database may comprise comparing the sensor image with a daylight perspective view image provided by the database 300 and the low ambient light two-dimensional perspective view image provided by the database 300. The system may further comprise determining input data for which the sensor image and the at least one two-dimensional perspective view image correspond best to each other for both the daylight perspective view image and the low ambient light perspective view image. At least one of the following quantities pitch angle, roll angle, yaw angle and three-dimensional position of the aerial vehicle may be determined based on the determined input data relating to the daylight perspective view image and the determined input data relating to the low ambient light perspective view image.

The computer program product may when at least partly be run on the processor 420 be arranged to perform the method as described in relation to FIG. 1.

Figure 3:
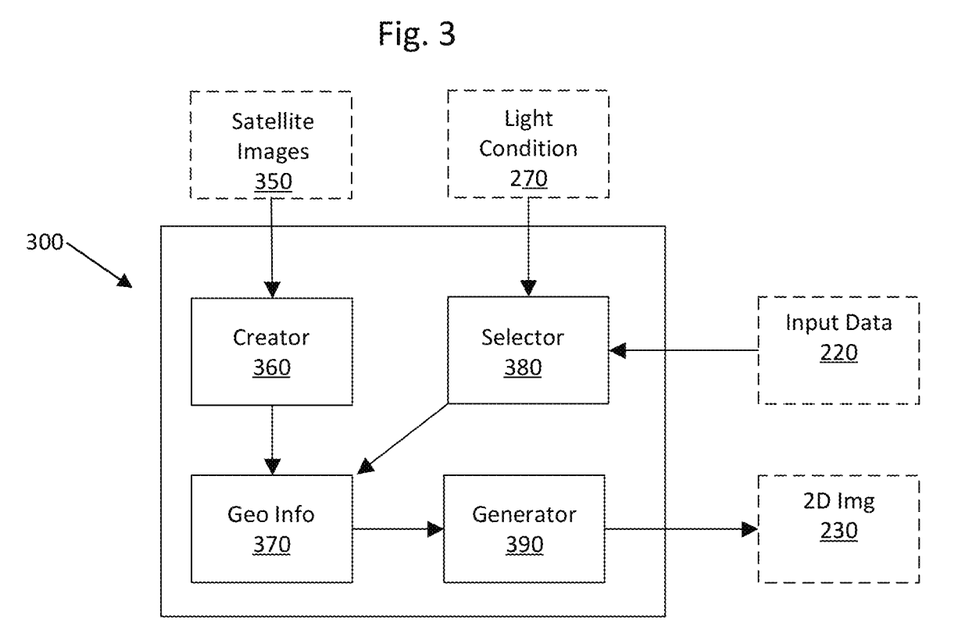
FIG. 3 depicts schematically a database for providing a perspective view image.

FIG. 3 depicts schematically a database 300 comprising three-dimensional geo-referenced information of the environment 370, said three-dimensional geo-refrenced information comprising texture data.

In one example the three-dimensional geo-referenced information of the environment 370 is a 3D map of the environment. In one example the three-dimensional geo-referenced information of the environment 370 is a 3D model of the environment. The 3D model could be any kind of 3D model known to those skilled in the art. In one example, the 3D model is represented as a mesh. In one example, the 3D model is represented as a multi-layer mesh. In another example the 3D model is represented as a surface representation. In another example the 3D model is represented as a voxel representation. The 3D model includes texture information. In one example the 3D model is a point cloud. In one example the three-dimensional geo-referenced information of the environment 370 is represented in such a way that a 3D model or a 3D map of the environment could be constructed based on the information. In one example the 3D map is a triangular irregular network (tin)-based mesh draped with textures.

The texture data comprises a first set of texture data representing the surface of the Earth under low ambient light conditions. The first set of texture data is created based on low ambient light images. The texture data may further comprise a second set of texture data representing the surface of the Earth under low daylight conditions. The second set of texture data is created based on daylight images captured under daylight conditions.

At least part of the three-dimensional geo-referenced information of the environment 370 may be created by a three-dimensional geo-referenced information creator 360 based on aerial and/or satellite images 350 of Earth. The aerial and/or satellite images 350 may be two-dimensional perspective view images. At least part of the aerial and/or satellite images 350 are images of Earth under low ambient light conditions. Characteristically, the creation of the three-dimensional geo-referenced information of the environment 370 based on aerial and/or satellite images 350 of Earth by the three-dimensional geo-referenced information creator 360 is made in advance. Consequently, the three-dimensional geo-referenced information of the environment 370 may be created and stored on a memory storage device (not shown) comprised in the database 300 in advance.

The database 300 is arranged to provide at least one two-dimensional perspective view image. The database 300 comprises in the illustrated example a perspective view selector 380 and a two-dimensional perspective view image generator 390.

The perspective view selector 380 may be arrange to, based on the input data 220, select the virtual perspective view of the three-dimensional geo-referenced information of the environment 370 representing a part of Earth's surface corresponding to the assumed perspective view of the image sensor capturing the sensor image. The perspective view selector 380 obtains input data 220 and calculates a corresponding perspective view of the three-dimensional geo-referenced information of the environment 370 representing a part of the Earth's surface. The perspective view selector 380 may obtain light condition information 270 relating to the light conditions during sensor image capture. Obtained light condition information 270 relating to low ambient light conditions may result in selecting for the generation of a two-dimensional perspective view images at least some three-dimensional geo-referenced information of the environment 370 representing a part of Earth's surface during low ambient light conditions.

The perspective view image generator 390 obtains three-dimensional geo-referenced information of the environment 370 relating to at least one perspective view selected by the perspective view selector 380 and generates at least one two-dimensional perspective view image. The perspective view image generator 390 provides at least one two-dimensional perspective view image to be compared with the sensor image in the comparing step. As an example the perspective view image generator may generate a daylight, a dusk and/or a night two-dimensional perspective view image.

The three-dimensional geo-referenced information creator 360, the three-dimensional geo-referenced information of the environment 370, the perspective view selector 380 and the two-dimensional perspective view image generator 390 may be part of at least one computer program running on at least one computer device.

Figure 4:
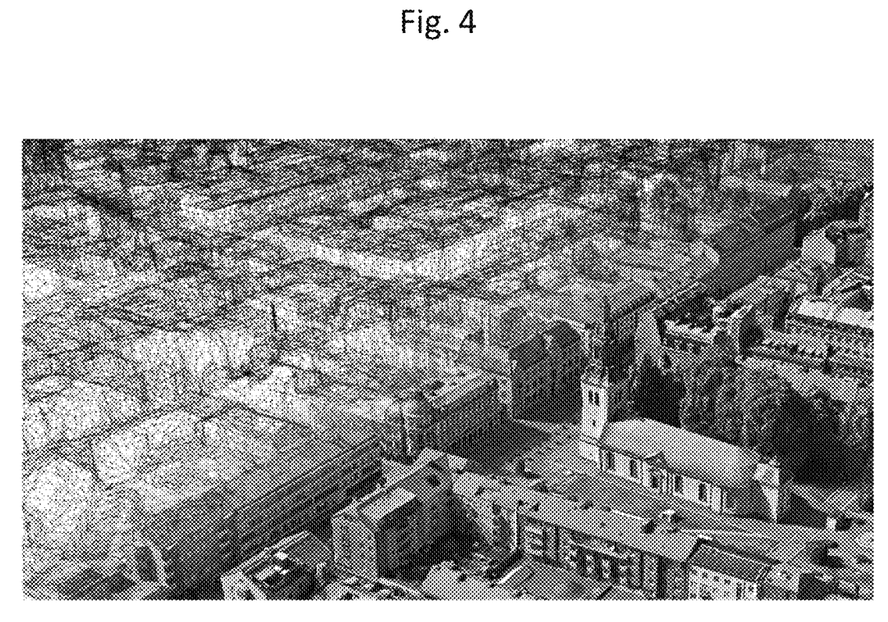
FIG. 4 discloses an example of a visualisation of three-dimensional geo-referenced information of the environment, said tree-dimensional georeferenced information comprising texture data.

FIG. 4 discloses an example of a visualisation of three-dimensional geo-referenced information of the environment, said tree-dimensional georeferenced information comprising geo-referenced coordinate data and texture data. In the illustrated example, the geo-refrenced coordinate data forms a mesh. The mesh is draped with texture data. In the present disclosure the texture data comprises at least two different sets of texture data, wherein a first set represents a surface of Earth under low ambient light conditions and a second set prepresents a surface of Earth under daylight conditions.

Figure 5:
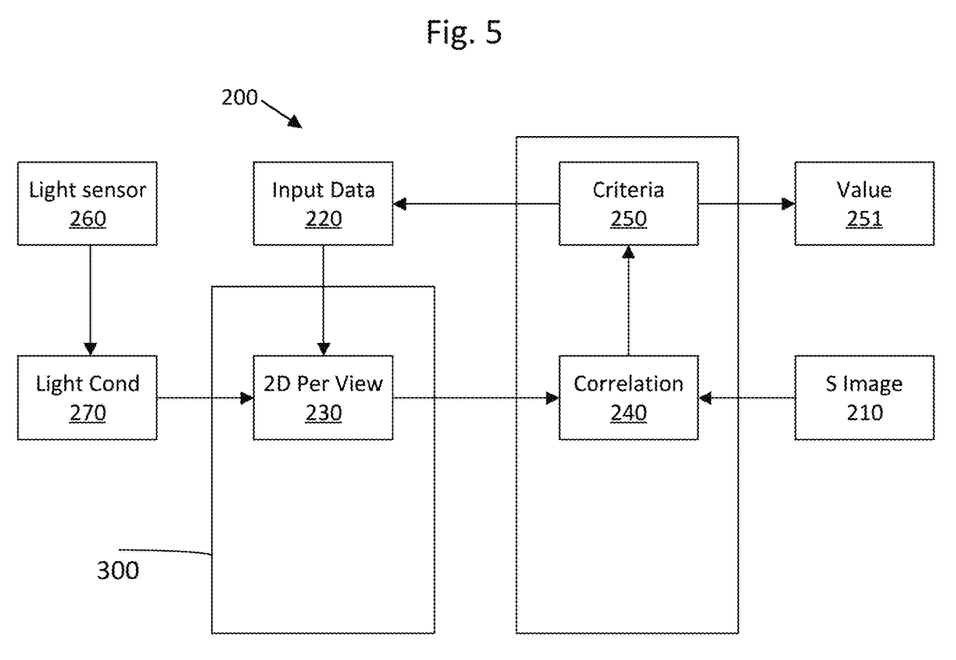
FIG. 5 depicts schematically an example of the flow of information when performing the method.

FIG. 5 depicts schematically an example of the flow of information 200 when performing the method 100 as discussed in relation to FIG. 1. The steps of the method 100 depicted in FIG. 1 generate and transport information, such as sensor images 210, input data 220 and two-dimensional perspective view images 230. The example of the flow of information illustrated in FIG. 2 obtains sensor images 210 and possibly light information 260 and provides at least one new value 251 for pitch angle and/or roll angle and/or yaw angle and/or three-dimensional position of the aerial vehicle.

The method 100 as discussed in relation to FIG. 1 is initiated by capturing the sensor image 210 of the physical environment and the input data 220 is set. The input data 220 is set based on the currently assumed navigation values comprising pitch angle, roll angle, yaw angle and three-dimensional position of the vehicle. Further, the light information is obtained. For example, at least one light sensor may capture the light information 260. Alternatively, the light information may be based on a clock indicating which time of the day it is. The light information 260 is used to generate the light condition information 270 relating to the estimated light conditions the sensor image 210 was captured under. The light condition information 270 may be set by the user. The light condition information 270 may be automatically set based on time of day and approximate location. The sensor image may be used to generate the light condition information 270.

The input data 220 and the light information 270 are provided to the database. The database comprises a representation of at least part of the Earth's surface. The database comprises three-dimensional geo-referenced information of the environment, said three-dimensional geo-referenced information comprising texture data. The database utilizes the input data 220 to determine a perspective view of the three-dimensional geo-referenced information of the environment. The light condition information 270 is used to select at least part of the three-dimensional geo-referenced information of the environment under light conditions corresponding to the light condition information in order to generate at least one two-dimensional perspective view image 230. T At least two two-dimensional perspective view images 230 representing Earth's surface under different ambient light conditions may be selected.

The at least one two-dimensional perspective view image 230 and the sensor image 210 are compared to create a set of correlation values 240. The set of correlation values 240 is not limited to information related to the statistical correlation between images. The set of correlation values may comprise any information related to the comparisons of two-dimensional images.

At least one predetermined criterion 250 together with the set of correlation values 240 determine what action is performed next. If the set of correlation values 240 satisfy the at least on predetermined criterion 250 relating to an acceptable correlation then the input data 220 corresponding to the two-dimensional perspective view image 230 best correlating to the sensor image 210 is used to determine a value 251 for at least one of the following quantities pitch angle, roll angle, yaw angle and three-dimensional position of the vehicle.

If the set of correlation values 240 does not satisfy the at least one predetermined criterion 250 relating to an acceptable correlation then the input data 220, the at least one two-dimensional perspective view image 230 and the sensor image 210 are compared to determine a set of values for updating the input data 220. The updated input data 220 is used to generate at least one new two-dimensional perspective view image 230 for comparison with the sensor image 210. The determining of the set of values for updating input data 220 may utilize the set of correlation values 240.

The set of correlation values 240 may satisfy at least one stop criterion 250 whereby the iterative comparing of at least one two-dimensional perspective view image 230 with the sensor image 210 ends without determining a value 251 for at least one of the following quantities pitch angle, roll angle, yaw angle and three-dimensional position of the vehicle. At least one stop criterion 250 for ending may be related to an amount of time having passed since the sensor image 210 was captured. At least one stop criterion 250 for ending may be related to at least one created set of correlation values 240 corresponding to an a typically weak correlation between the two-dimensional perspective view image 230 and the sensor image 210.

The invention is not limited to the above-described embodiments and many modifications are possible within the scope of the following claims. Indeed, a person of ordinary skill in the art would be able to use the information contained in the preceding text to modify various embodiments of the invention in ways that are not literally described, but are nevertheless encompassed by the attached claims, for they accomplish substantially the same functions to reach substantially the same results. Therefore, it is to be understood that the invention is not limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method (100) for navigation of a vehicle, the method (100) comprising:
   obtaining (110) a sensor image (210) from a vehicle sensor and repeatedly, until at least one predetermined criterion (250) is reached, performing the steps of:
   setting (120) input data (220) comprising information related to pitch angle, roll angle, yaw angle and three-dimensional position of the vehicle;
      providing (130) at least one two-dimensional perspective view image (230) based on the input data (220), where the at least one two-dimensional perspective view image (230) is obtained from a database (300) comprising three-dimensional geo-referenced information of the environment (370), said three-dimensional geo-referenced information comprising texture data; and
      comparing (140) the obtained sensor image (210) and the at least one two-dimensional perspective view image (230) associated to the present input data setting; and
   when at least one of the at least one predetermined criterion (250) is reached, performing a determining step (150) of using the input data (220) for the two-dimensional perspective view image (230) best corresponding to the sensor image (210) to determine a value (251) for at least one of the following quantities pitch angle, roll angle, yaw angle and three-dimensional position of the vehicle,
   wherein:
      the texture data comprises a first set of texture data representing a surface of Earth under low ambient light conditions, and
      the comparing step (140) comprises matching the sensor image (210) and the at least one low ambient light two-dimensional perspective view image (230) formed from the first set of texture data.

2. The method according to claim 1, wherein the step of providing (130) at least one two-dimensional perspective view image (230) based on the input data (220) comprises providing the two-dimensional perspective view image (230) in such a way that the perspective view corresponds to the perspective view of the vehicle sensor, where it is assumed that the vehicle has its pitch angle, roll angle, yaw angle and three-dimensional position according to the input data (220).

3. The method according to claim 1, wherein the first set of texture data is created (360) based on low ambient light images captured under low ambient light conditions.

4. The method according to claim 3, wherein the texture data comprises a second set of texture data created (360) based on daylight images captured under daylight conditions.

5. The method according to claim 1, wherein:
   the three-dimensional geo-referenced information of the environment (370) comprises the three-dimensional geo-referenced coordinate data and associated two-dimensional perspective view satellite images (350) related to a plurality of views, and
   at least some of the two-dimensional perspective view satellite images (350) comprise the first set of texture data captured under low ambient light conditions.

6. The method according to claim 5, wherein at least some of the two-dimensional perspective view satellite images (350) comprise the second set of texture data captured under daylight conditions.

7. The method according to claim 1, wherein the step of providing (130) at least one two-dimensional perspective view image (230) comprises a step of obtaining light condition information (270) related to whether the sensor image (210) was captured under low-light conditions and at least when it is determined that capture occurred under low-light conditions, provide the at least one low ambient light two-dimensional perspective view image (230) formed from the first set of texture data.

8. The method according to claim 7, wherein:
   the step of obtaining light condition information (270) related to whether the sensor image (210) was captured under low-light conditions comprises obtaining time information, and
   the light condition is determined based on a relation between the time information and a time of sunrise/sunset.

9. The method according to claim 7, wherein the step of obtaining light condition information (270) related to whether the sensor image (210) was captured under low-light conditions comprises obtaining sensor data from at least one light sensitive sensor (260).

10. The method according to claim 7, further comprising a step of comparing the sensor image (210) with a daylight two-dimensional perspective view image (230) provided based on the second set of texture data and/or a low ambient light two-dimensional perspective view image (230) provided based on the first set of texture data, said sensor image (210), daylight perspective view image (230) and low ambient light perspective view image (230) corresponding to the same perspective view, and determining whether the sensor image (210) was captured under low-light conditions based on said comparison.

11. The method according to claim 1, wherein:
the step of comparing (140) the sensor image (210) with the at least one two-dimensional perspective view image (230) generated based on the database comprises comparing the sensor image (210) with a daylight perspective view image (230) provided from the second set of texture data (300) and a low ambient light two-dimensional perspective view image (230) provided from the first set of texture data,
the method further comprises a step of determining input data (220) for which the sensor image (210) and the at least one two-dimensional perspective view image (230) correspond best to each other for both the daylight perspective view image and the low ambient light perspective view image, and
at least one of the following quantities pitch angle, roll angle, yaw angle and three-dimensional position of the vehicle is determined based on the determined input data relating to the daylight perspective view image (230) and the determined input data relating to the low ambient light perspective view image (230).

12. The method according to claim 1, wherein an uncertainty measure is determined at least for the matching of the sensor image (210) to the two-dimensional perspective view image (230) which best corresponds to the sensor image.

13. A computer program product for performing the method (100) for navigation of a vehicle according to claim 1.

14. A system (400) for navigation of a vehicle, the system comprising:
a database (300) comprising three-dimensional geo-referenced information of the environment (370), said three-dimensional geo-referenced information comprising texture data,
at least one vehicle sensor (410) arranged to provide (130) a sensor image (210),
a processor (420) and a memory storage device comprising a computer program product arranged, when run on the processor (420), to:
control the vehicle sensor (410) to provide (110) a sensor image (210), and repeatedly, until at least one predetermined criterion (250) is reached, perform the steps to:
set (120) input data (220) comprising information related to pitch angle, roll angle, yaw angle and three-dimensional position of the vehicle;
provide input data (220) to the database (300), whereby the database (300) provides (130) at least one two-dimensional perspective view image (230) based on the input data (220),
compare (140) the sensor image (210) and at least one of the at least one two-dimensional perspective view image (230) from the database (300); and
use the input data (220) for which the corresponding two-dimensional perspective view image (230) correspond best to the sensor image (210) to determine at least one value (251) of the following quantities pitch angle, roll angle, yaw angle and three-dimensional position of the vehicle,
wherein:
the texture data comprises a first set of texture data representing a surface of Earth under low ambient light conditions,
at least one of the at least one two-dimensional perspective view image (230) is formed from the first set of texture data, and
the at least one low ambient light two-dimensional perspective view image (230) and the sensor image (210) is compared in the comparing step (140).

15. The system according to claim 14, wherein the first set of texture data is created (260) based on low ambient light images (350).

16. The system according to claim 14, wherein the sensor image comprises at least two detected light points and the comparison (140) step comprises comparing the detected light points with the light points in the two-dimensional perspective view image (230).

* * * * *